(12) United States Patent
Jalkanen et al.

(10) Patent No.: US 10,764,731 B2
(45) Date of Patent: Sep. 1, 2020

(54) METHODS AND APPARATUSES FOR PROVIDING A SERVICE TO AN IOT DEVICE

(71) Applicant: Telia Company AB, Solna (SE)

(72) Inventors: Tero Jalkanen, Tuusula (FI); Tomi Sarajisto, Helsinki (FI)

(73) Assignee: Telia Company AB, Solna (SE)

( * ) Notice: Subject to any disclaimer, the term of this patent is extended or adjusted under 35 U.S.C. 154(b) by 54 days.

(21) Appl. No.: 15/946,470

(22) Filed: Apr. 5, 2018

(65) Prior Publication Data

US 2018/0295485 A1 Oct. 11, 2018

(30) Foreign Application Priority Data

Apr. 7, 2017 (EP) .................... 17165505

(51) Int. Cl.
| | |
|---|---|
| H04W 4/50 | (2018.01) |
| H04L 29/08 | (2006.01) |
| H04W 4/70 | (2018.01) |
| H04W 12/00 | (2009.01) |
| H04W 76/10 | (2018.01) |
| H04W 48/16 | (2009.01) |
| H04W 12/10 | (2009.01) |
| H04L 29/06 | (2006.01) |

(52) U.S. Cl.
CPC ............ *H04W 4/50* (2018.02); *H04L 67/12* (2013.01); *H04L 67/34* (2013.01); *H04W 4/70* (2018.02); *H04W 12/009* (2019.01); *H04W 48/16* (2013.01); *H04W 76/10* (2018.02); *H04L 63/12* (2013.01); *H04W 12/10* (2013.01)

(58) Field of Classification Search
CPC ..... H04W 4/50; H04W 12/009; H04W 76/10; H04W 48/16; H04W 4/70; H04W 12/10; H04L 67/12; H04L 67/34; H04L 63/12
See application file for complete search history.

(56) References Cited

U.S. PATENT DOCUMENTS

| | | |
|---|---|---|
| 9,769,648 B2 | 9/2017 | Bas Sanchez et al. |
| 2014/0128050 A1 | 5/2014 | Bas Sanchez et al. |
| 2016/0048580 A1 | 2/2016 | Raman |

(Continued)

FOREIGN PATENT DOCUMENTS

EP 3043585 A1 7/2016

OTHER PUBLICATIONS

European Search Report, App. No. 17165505.3-1854, dated Aug. 31, 2017, pp. 1-21, European Patent Office, Munich, Germany.

(Continued)

*Primary Examiner* — Jackie Zuniga Abad
(74) *Attorney, Agent, or Firm* — Burr & Forman LLP; Jeffrey H. Kamenetsky

(57) ABSTRACT

The embodiments herein relate to methods and apparatuses for activating or running services or resources requested by an IoT device. The IoT device requests attachment to a mobile network by sending a request to core network which confirms said attachment. The IoT device then transmits a software/data container to the core network, the container comprises features/functions needed for running the requested resource/service. A network edge device then sets up the resource/service enabling the IoT device to run the service/resource provided the core network validates the software/data container. There is also provided a network edge device and a core network.

17 Claims, 7 Drawing Sheets

(56) References Cited

U.S. PATENT DOCUMENTS

2016/0248850 A1 8/2016 Agrawal et al.
2016/0259923 A1 9/2016 Papa et al.

OTHER PUBLICATIONS

Renner Thomas et al, Towards Container-Based Resource Management for the Internet of Things, 2016 International Conference on Software Networking (ICSN), IEEE, May 23, 2016, pp. 1-5, XP032917385, DOI: 10.1109/ICSN.2016.7501933.
Taleb Tarik et al, Lightweight Mobile Core Networks for Machine Type Communications, IEEE Access, vol. 2, Sep. 22, 2014, pp. 1128-1137, XP011560464, DOI: 10.1109/ACCESS.2014.2359649.

METHODS AND APPARATUSES FOR PROVIDING A SERVICE TO AN IOT DEVICE

TECHNICAL FIELD

The present disclosure generally relates to wireless communications and more particularly to methods and apparatuses for providing a service or resource to an Internet-of-Things (IoT) device in a network environment.

BACKGROUND

Mobile Edge Computing (MEC) is a technology which is standardized by the European Telecommunications Standard Institute (ETSI). MEC provides an IT service environment and cloud-computing capabilities at the edge of the mobile network, within the Radio Access Network (RAN) and in close proximity to mobile subscribers. The aim is to reduce latency, ensure highly efficient network operation and service delivery, and also offer an improved user experience.

Based on a virtualized platform, MEC is an emerging technology for 5G networks together with Network Functions Virtualization (NFV) and Software-Defined Networking (SDN). MEC helps in advancing the transformation of the mobile broadband network into a programmable world and contributes to satisfying the demanding requirements of 4G or 5G in terms of throughput, latency, scalability and automation.

The number of IoT devices is expected to reach billions. These devices have very low computing power as a complex system is not considered to perform most IoT tasks. An example of such an IoT device is a sensor device such as a temperature sensor, a tracking device, a metering device, etc., with the capability to connect to the Internet. Many IoT devices comprise a microcontroller, sensors and SIM modules for wireless communications. There is a need to aggregate various IoT device messages connected through the mobile network close to the devices. Various devices are connected over different forms of connectivity such as 3G, LTE, WiFi, 5G, or other radio technologies. In general, the messages generated by these devices are small and come in different forms of protocols. There is therefore a need for a low latency aggregation point to manage the various protocol and distribution of messages. MEC can be used to connect and control these devices remotely and enables distribution of IoT services into the highly distributed mobile base station environment and enable applications to respond in quickly.

However, currently, resource delivery or orchestration is always thought to be masterminded by a central entity such as the NFV enabled operator pushing/provisioning a set of functions towards the IoT devices. This works adequately in some scenarios, but does not fit all cases, especially the ones which need services at the network edge. Also, provisioning/pushing adds a lot of unnecessary management overhead to the operator cloud and does not work well, if at all, in roaming scenarios.

SUMMARY

It is an object of embodiments herein to solve the above problems by providing methods and apparatuses for providing services and/or resources to an IoT device when needed and in an automated fashion run or activate these services or resources dynamically using geographically optimal mechanism, i.e., offer them via the MEC rather than the central cloud NFV as per fog computing.

According to an aspect of some embodiments herein, there is provided a method performed by an IoT device for requesting at least one resource and/or service in a network. The method comprising: sending a request to a core network, requesting attachment to a mobile network; receiving an acknowledgement from the core network confirming attachment to the mobile network; transmitting a software/data container including features and/or functions needed for running the requested resource(s) and/or service(s) and running the requested resource(s) and/or service(s) set up by a network edge device when the core network validates the software/data container. The network edge device being a MEC network edge device that is closest to the IoT device.

According to another aspect of some embodiments herein, there is provided a method performed by a network edge device for setting up resource(s) and/or service(s) for an IoT device. The method comprising: receiving, from a core network, a software/data container including features and/or functions needed for running said resource(s) an/or service(s) requested by the IoT device and setting up the requested resource(s) and/or service(s) for the IoT device enabling the IoT device to run the requested service(s) and/or resources.

According to another aspect of some embodiments herein, there is also provided a method performed by a core network for the setting up of resource(s) and/or service(s) for an IoT device. The method includes: receiving from the IoT device a request for attaching the IoT device to a mobile network; transmitting, to the IoT device, an acknowledgement confirming said attachment to the mobile network; receiving, from the IoT device, a software/data container including features and/or functions needed for running resource(s) and/or service(s) requested by the IoT device. The method further comprising, checking the validity of the software/data container; transmitting, to a network edge device, the software/data container to be run as part of a Virtual Network Functions (VNF) environment, when the software/data container is considered valid; and receiving an acknowledgment from the network edge device, confirming the setting up of the resource(s) and/or service(s) for the IoT device.

There is also provided an IoT device as described in appended claim 11; a network edge device as described in claim 15 and a core network as described in claim 20.

An advantage with the present disclosure is to reduce management overhead from the operator's cloud.

Another advantage is to let IoT devices themselves request for features and resources they need to run when such an IoT device is unwrapped for the first time and switched on, or when such a device is roaming from a home network to a visited network.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

Figure 1:
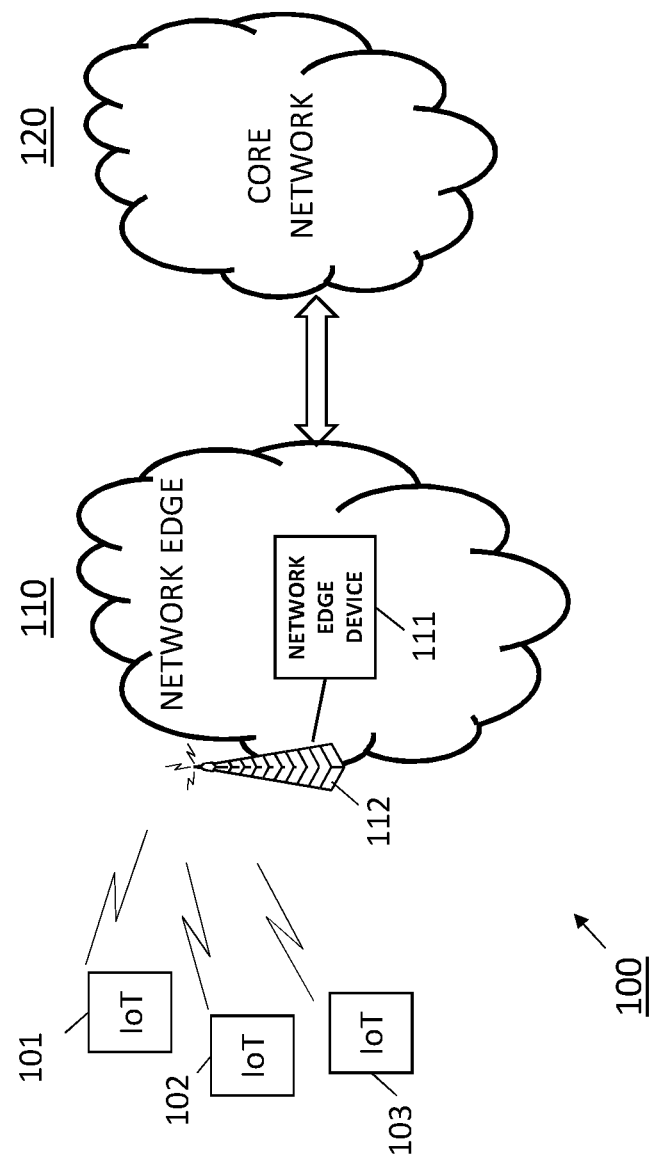
FIG. 1 illustrates a schematic overview of a network environment wherein embodiments herein may be applied.

Referring to FIG. 1, there is illustrated a schematic overview of a network environment 100 wherein embodiments herein may be employed.

The network environment 100 comprises a plurality of IoT devices 101, 102, 103; a network edge 110 and a core network 120. In a non-limiting embodiment, IoT device 101 may be a temperature sensor; IoT device 102 may be a tracking device and IoT device 103 may be a metering device. All devices are provided with capabilities to connect to the Internet and/or to any suitable network. Many IoT devices comprise a microcontroller, sensors and SIM modules for wireless communications. Other examples of IoT devices are environmental sensors, medical trackers, home appliances, and industrial devices.

The edge network 110 may be viewed as a MEC network and comprises a network edge device 111 such as a MEC server with virtual network functionality (VNF). A radio base station 112 is also shown to which the IoT devices may connect wirelessly. The radio base station 112 may be part of any radio access technology including 3G, 4G (or LTE), 5G, WiFi etc. The network edge device 111 can be deployed at multiple locations, such as at the radio base station 112 site (e.g., a eNodeB or eNB), at the 3G radio network controller site, at a multi-radio Radio Access Technology (RAN) cell aggregation site, and at an aggregation point, which may also be at the edge of the core network. The network edge device 111 is shown connected to radio base station 112.

According to embodiments herein, the edge network 110 and the mobile network to which radio base station 112 belongs are closest to IoT devices 101, 102, 103. This means that instead of having multi-hops as in the case with cloud computing, the distance between the IoT device to the edge network requires only one hop. This is advantageous since latency in communication is low because the location of services is at the edge. Also, the edge network is aware of the location of the IoT devices.

Using a container model such as Docker, it is possible to put software in a package which could then be run anywhere in the network edge or IP cloud. This offers a dynamic model since a container can be set up in a fraction of a second when needed and then terminated when no longer required. In practice, a container wraps up a piece of software in a complete file system that contains what is needed to run, guaranteeing it will always run the same, regardless of the environment. Docker is an open source container based virtualization technology which can help develop and scale IoT service applications easy and fast. The software of a container includes features and/or functions needed for running the requested resource/service or application. Example of software functions are VNF functions required to run an IoT service or application. An advantage with a Docker container is that it can run on any modern Linux system or windows system.

It should be noted that embodiments of the present disclosure may use already existing functionality such as software containers and bundling of resources into a resource group template defined by, e.g., JavaScript Object Notation (JSON), which can then be used to deploy resources consistently and repeatedly.

According to some embodiments herein, each IoT device is provided with a software or data container including features and/or functions needed for running the requested resource/service application. The software/data container may be provided to the IoT device already at the factory with a resource template, illustrating the set of resources needed from the network to work properly.

In general and according to some embodiments herein, when an IoT device is switched on for the first time, or roams from a home network to a visited network, the IoT device automatically requests the network to create instances of the necessary services and brings them at the edge of the network. In practice, the IoT devices send a software/data container supporting the particular features and/or functions it needs to the network which is then responsible for running (or setting up) the container. Once the network has performed this, the IoT device can use (or run) the service instances to function properly. The container can be a very small restricted package since an IoT device does not necessarily need many features or resources from the network, thus including the container as part of even a very simple IoT device is feasible due to small memory demand and low complexity of the device.

It should be noted that the software/data may be included in the IoT device or fetched from a cloud, e.g., via URL (or other pointer). The resource set can be set to be completely private, i.e., unique to the device, or it can be shared among similar devices in the area. For example, all IoT thermometers in a particular region could be served with the resource instance in "mini cloud" in the area created once when the devices are switched on. The IoT device thus will have the correct resources/services offered by the network in a close distance from it, regardless of where it actually is. For example, in case the IoT device is a part of a vehicle moving across Europe, it automatically asks for a set of resources/services or functions offering low latency offered by the edge network or MEC.

Figure 2:
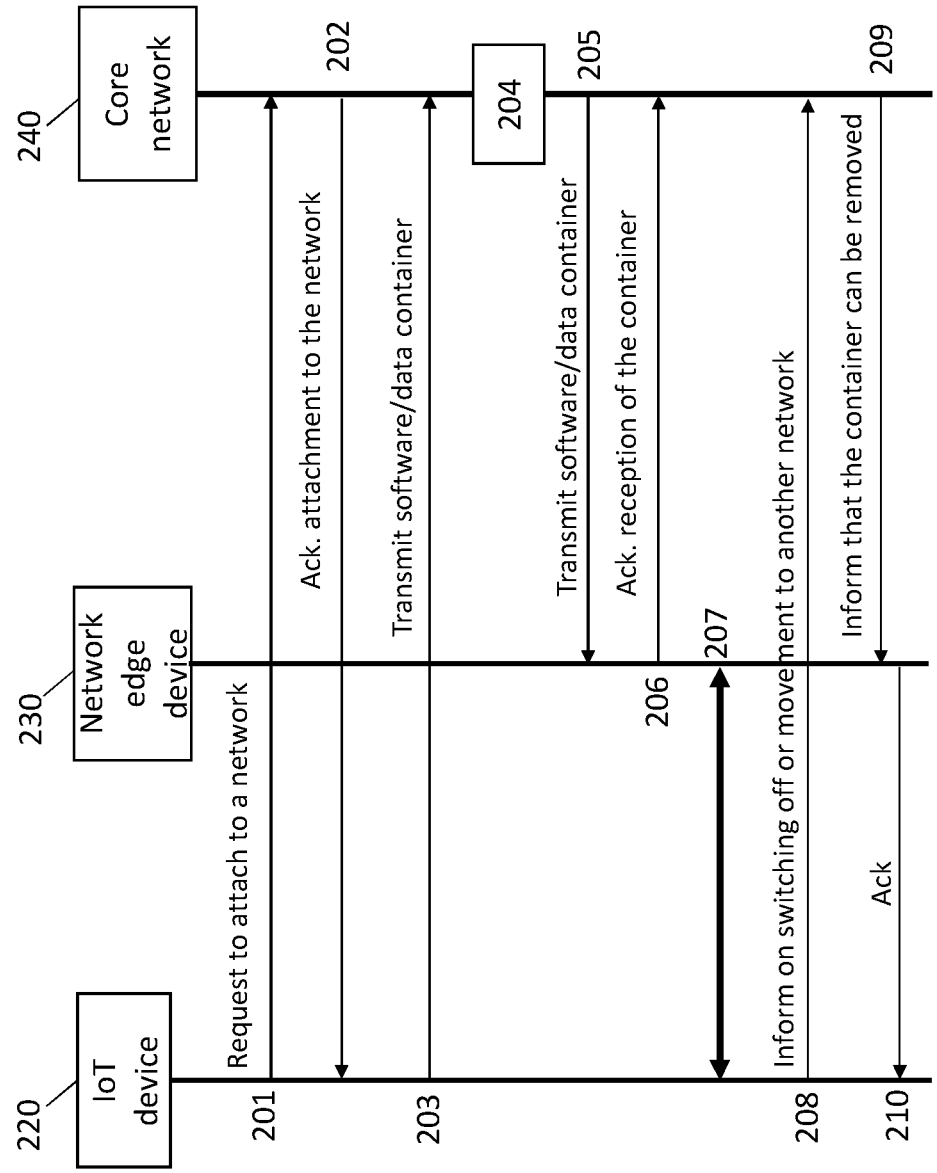
FIG. 2 illustrates a signaling diagram according to embodiments herein.

Referring to FIG. 2, there is illustrated a signaling diagram according to embodiments herein involving an IoT device 220, a network edge device 230 (of a MEC environment) and a core network 240. In order for the IoT device 220 to request a resource/service in a network the following actions are performed.

In action 201, the IoT device 220 sends a request to the core network 240 requesting attachment to the mobile network. In this case, when the IoT device 220 switches on or moves/roams from a home network to a visited network, it searches for a mobile network to which it wants to attach. The mobile network may include the radio base station 112 shown in FIG. 1 which is shown located at the edge of network (MEC) 110.

In action 202, the core network 240 accepts the request for attachment and allows the IoT device 220 to attach. The IoT device 220 receives an acknowledgment (Ack) confirming attachment to the mobile network.

Actions 201 and 202 are normal Third Generation Partnership Project (3GPP) specified procedures for attaching a device to a mobile network.

In action 203, and according to embodiments herein, the IoT device 220 transmits a software/data container to the core network 240. The container includes features and/or functions needed for running the requested resource/service or application.

In action 204, the core network 240 checks the validity of the software/data container. The core network 240 may also determine whether or not it can support the needs of the IoT device 220. Here it is assumed that the core network 240 determines that the software/data container is valid.

In action 205, the core network 240, after validation of the container, sends the software/data container to the network edge device 230 to be run as part of the VNF environment there.

In action 206, the network edge device 230 acknowledges reception of the container and the request from the core network 240 to run it as part of the VNF environment.

In action 207, the network edge device 230 sets up the resource/service enabling the IoT device 220 to use it or run it.

In action 208, when the IoT device 220 switches off or moves or roams to another network, the core network 240 is informed by the IoT device 220.

In action 209, the core network 240 informs the network edge device 230 that the software/data container of the IoT device can be removed or deleted and that the connectivity/attachment terminates.

In action 210, the network edge device 230 acknowledges the switching off or movement/roaming of the IoT device 220, and also confirms termination of the resource/service.

It should be mentioned that resources can be certified, in order to make sure that they are not tampered with, especially in case the same set of resources is shared among multiple IoT devices. That is why validation of the features and/or functions by the core network is important. Since the service or resource is set up and run in the network edge device which is close to the IoT device, the management overhead from the operator's cloud is reduced.

The main IoT application or service in the IoT device may automatically link itself to a SIM (Universal Integrated Circuit Card (UICC)) card. Authorization of an IoT device would be based on normal SIM procedures between the IoT device and the operator's core network for attachment to the mobile network. Also, buying and payment of the network resources or services required by the IoT device may rely on SIM based authentication. An operator would then be in charge of charging and billing for local IoT resources. Also, using SIM provides a strong communication layer authentication to a particular subscription, getting around problems related to other types of identification schemes such as username/password, certificates or fixed device IDs. Communication between the IoT device and the network may also reuse SIM for encrypting the data transport, avoiding the need for proprietary mechanisms. If additional application layer encryption is required between the IoT device and the IoT service provider, SIM can be used also for deployment and management of public/private key pairs, e.g., using end-to-end Transport Layer Security (TLS) or Virtual Private Network (VPN) tunneling.

Figure 3:
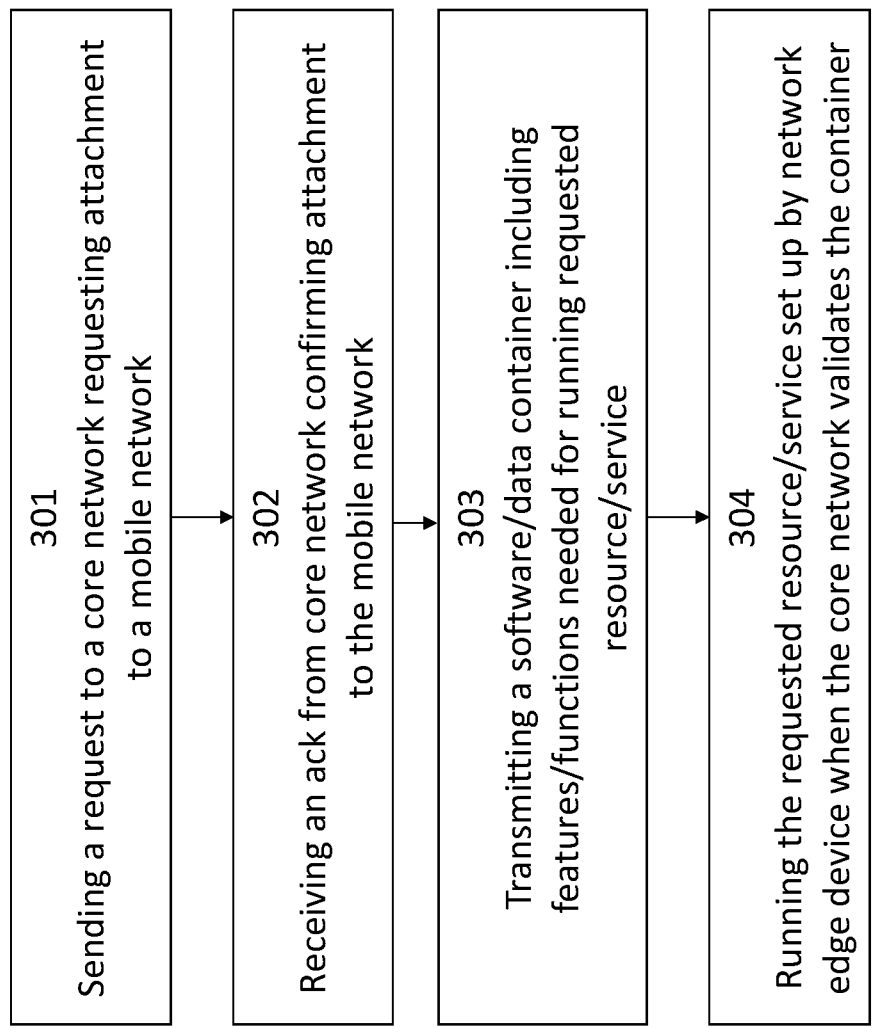
FIG. 3 illustrates a flowchart of a method performed by an IoT device according to some embodiments herein.

Referring to FIG. 3 there is illustrated a flowchart of a method performed by an IoT device for requesting a resource/service in a network according to some embodiments herein. The main steps include:

(301) sending a request to a core network requesting attachment to a mobile network. It should be noted that the request may be sent via an IoT gateway to which the IoT device maybe connected to.

(302) receiving an acknowledgement from the core network confirming attachment to the mobile network.

(303) transmitting a software/data container including features/functions needed for running the requested resource/service or application; and (304) running the requested resource/service or application set up by a network edge device when the core network validates (content of) the container.

As previously described, sending the request is performed when the IoT device is switched on or when the IoT device roams from a home network to a visited network or when the IoT device is reset. This allows the IoT device to have the correct resources/services offered by the network close to it.

According to an embodiment, when the core network receives the container and validates its content, the core network sends the software/data container further to the network edge device to be run as part of a Virtual Network Function (VNF) environment.

The IoT device may further inform the core network of the switching off (or when it roams) and the IoT device receives from the network edge device an acknowledgment confirming termination of the resource/service.

Figure 4:
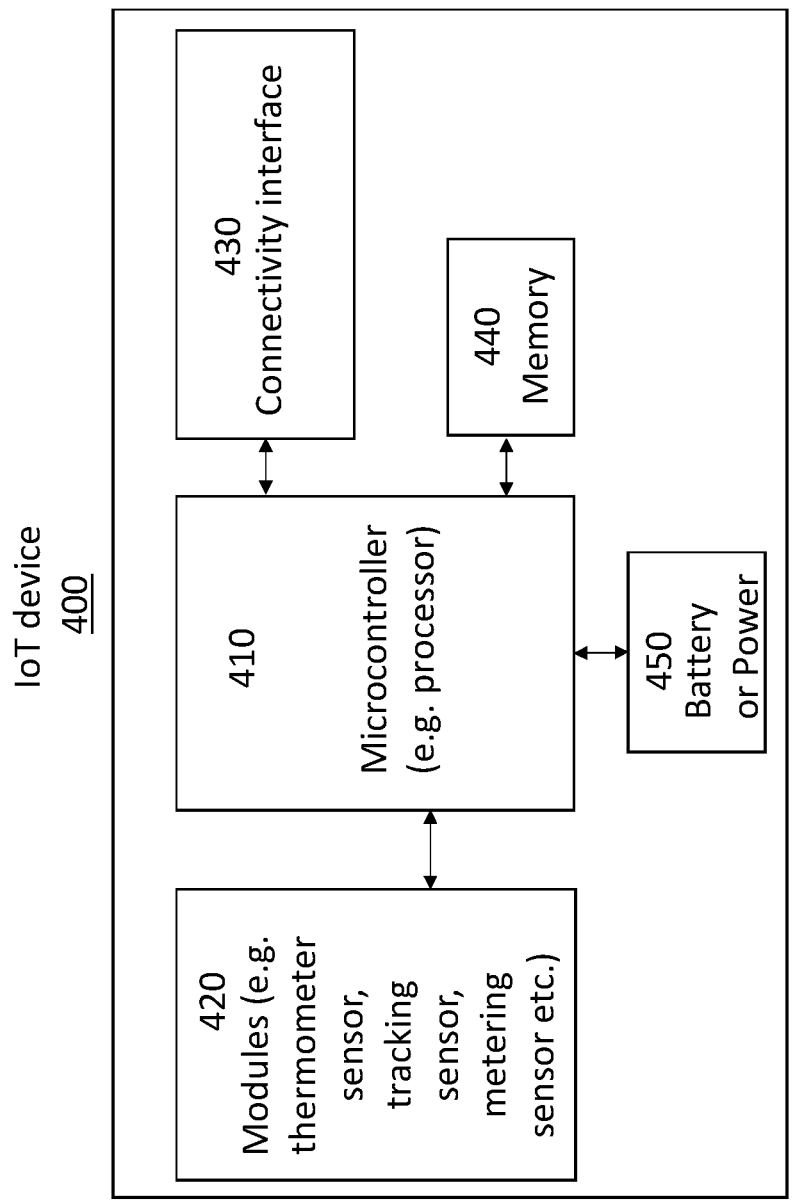
FIG. 4 illustrates a block diagram of an exemplary IoT device according to some embodiments herein.

In order to perform the method described above, there is provided an IoT device 400 which is exemplified in FIG. 4. As shown, the IoT device 400 comprises a microcontroller (e.g., a processor or microprocessor) 410, memory module/circuit 440, sensor module(s) 420 which may include one or more of a thermometer sensor, tracking sensor, metering sensor, environmental sensor, opto device, etc. The IoT device 400 is also shown comprising a battery or a power module 450 and a connectivity interface 430 for communicating with the mobile network and the core network. The interface may include both a wireless interface (such as Bluetooth, WLAN, GSM, UMTS, LTE, 5G, etc.) and a wireline interface (e.g., Ethernet). As previously described, the IoT device 400 may comprise a SIM card (UICC) (not shown). Additional components may also be included such as a display, indicators etc. The IoT device 400 may be a Narrow Band-IoT, a Low Power Wide Area (LPWA) device, a LTE-M, or any type of device that supports IoT technology.

The microcontroller or processor 410 controls the operation of the IoT device 400 and its components. Memory (circuit or module) 440 may include a Random Access Memory (RAM), a Read Only Memory (ROM), and/or another type of memory to store the software/data container and instructions that may be used by microcontroller 410.

The IoT device 400 is configured to send a request, to a core network, requesting attachment to a mobile network; to receive an acknowledgement from the core network confirming said attachment to the mobile network; to transmit a software/data container including features and/or functions needed for running a requested resource/service; and to run the requested resource/service set up by a network edge device when the core network validates the software/data container. An advantage is thus to let the IoT device 400 itself ask for services/resources they need, instead of having a model where resource delivery/orchestration is handled centrally which may lead to unnecessary management overhead to the operator cloud. Also, the IoT device has the most optimal knowledge of features/functions it requires in order to operate properly.

Additional details performed by the IoT device have already been described and need not be repeated.

There is also provided a computer program comprising instructions which when executed on at least the processor 410 of the IoT device 400 according to embodiments herein, causes the processor 410 to carry out the method previously described. Also a carrier containing the computer program is provided, wherein the carrier is one of a computer readable storage medium; an electronic signal, optical signal or a radio signal.

Figure 5:
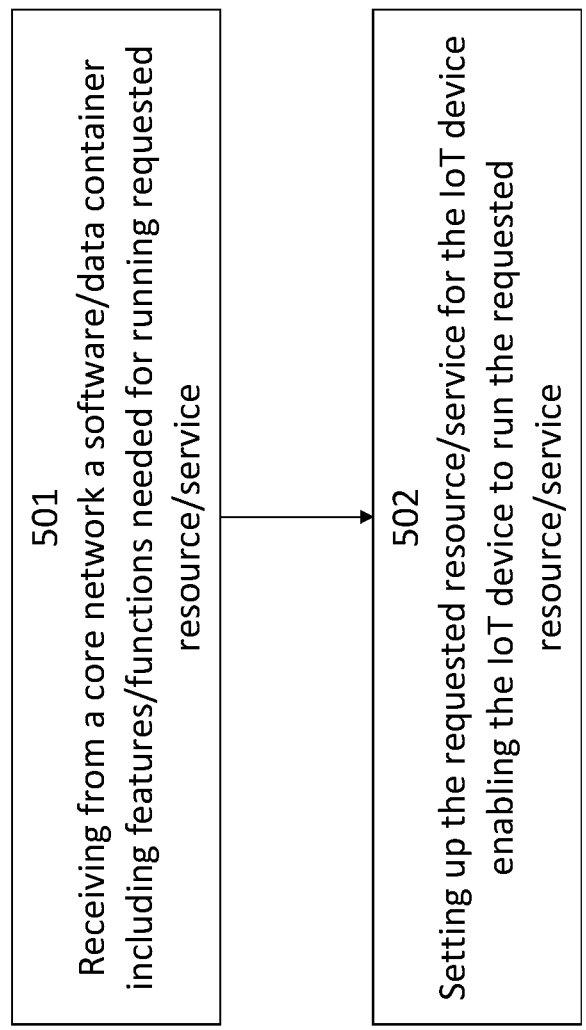
FIG. 5 illustrates a flowchart of a method performed by a network edge device according to some embodiments herein.

Referring to FIG. 5, there is illustrated a flowchart of a method performed by a network edge device according to some embodiments of the present disclosure. The method comprises:

(501) receiving from a core network a software/data container including features/functions needed for running a resource/service requested by an IoT device; and (502) setting up the requested resource/service for the IoT device enabling the IoT device to run the requested resource/service or application.

The method further comprises running the received features and/or functions, included in the software/data container, as part of a VNF environment when the core network validates the software/data container. The method also comprises receiving from the core network a request to remove or delete the software/data container when the IoT device switches off or when the IoT device detaches from the network; and sending an acknowledgment to the IoT device confirming termination of the resource/service.

Figure 6:
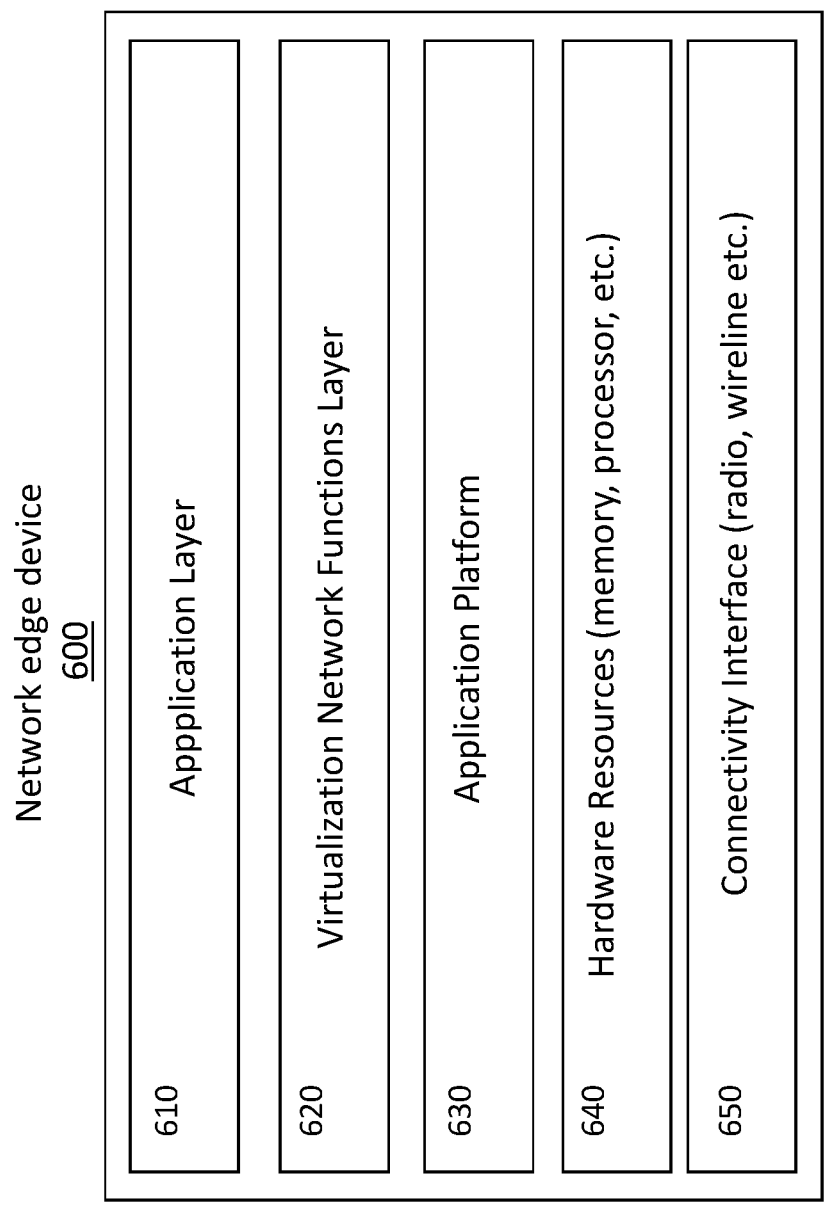
FIG. 6 illustrates a block diagram of an exemplary network edge device according to some embodiments herein.

In order to perform the method described above, there is provided a network edge device 600. FIG. 6 illustrates an exemplary block diagram of such a device. The network edge device 600 may be a MEC server and it may be connected to a node belonging to a Radio Access Network (RAN) (e.g., eNodeB, NodeB, RNC or any radio base station of the mobile network).

As shown, the network edge device 600 may comprise an application layer 610, a VNF layer 620, an application platform 630, hardware resources 640 and a connectivity interface 650 which may be a radio or wireless interface and/or a wireline interface, used to connect to the RAN and to the core network. The VNF layer 620 may comprise a plurality of network functions (VNFs). A VNF takes on the responsibility of handling specific network functions that run on one or more Virtual Machines (VMs) on top of the hardware networking infrastructure. Individual VNFs can be connected or combined together as building blocks to offer a networking communication service.

The hardware resources 640 may include a microprocessor (or processor) including an Application Specific Integrated Circuit (ASIC), Field Programmable Gate Array (FPGA), or the like. The processor controls the operation of the network edge device 600 and its components. Hardware resources 640 also include a memory such as a RAM, a ROM and/or any type of memory to store data and instructions of a computer program that may be used by the processor. The execution of the program instructions adapts or configures the processor to carry out the operations of the network device disclosed herein. The network edge device 600 may have additional capabilities such as cloud-computing capabilities (NFV architecture)

For setting up a resource/service requested by an IoT device, the network edge device 600 is configured to receive, from a core network, a software/data container including features and/or functions needed for running the resource/service requested by the IoT device; and to set up the requested resource/service for the IoT device enabling the IoT device to run the requested resource/service. The network edge device 600 is configured to run the received features and/or functions, included in the software/data container, as part of the VNF environment e.g., by means of VNF layer 620. The device 600 is configured to run the content of the container when the core network has validated the software/data container.

There is also provided a computer program comprising instructions which when executed on at least the processor of the network edge device 600 according to embodiments herein, causes the processor to carry out the methods previously described. Also a carrier containing the computer program is provided, wherein the carrier is one of a computer readable storage medium; an electronic signal, optical signal or a radio signal.

Figure 7:
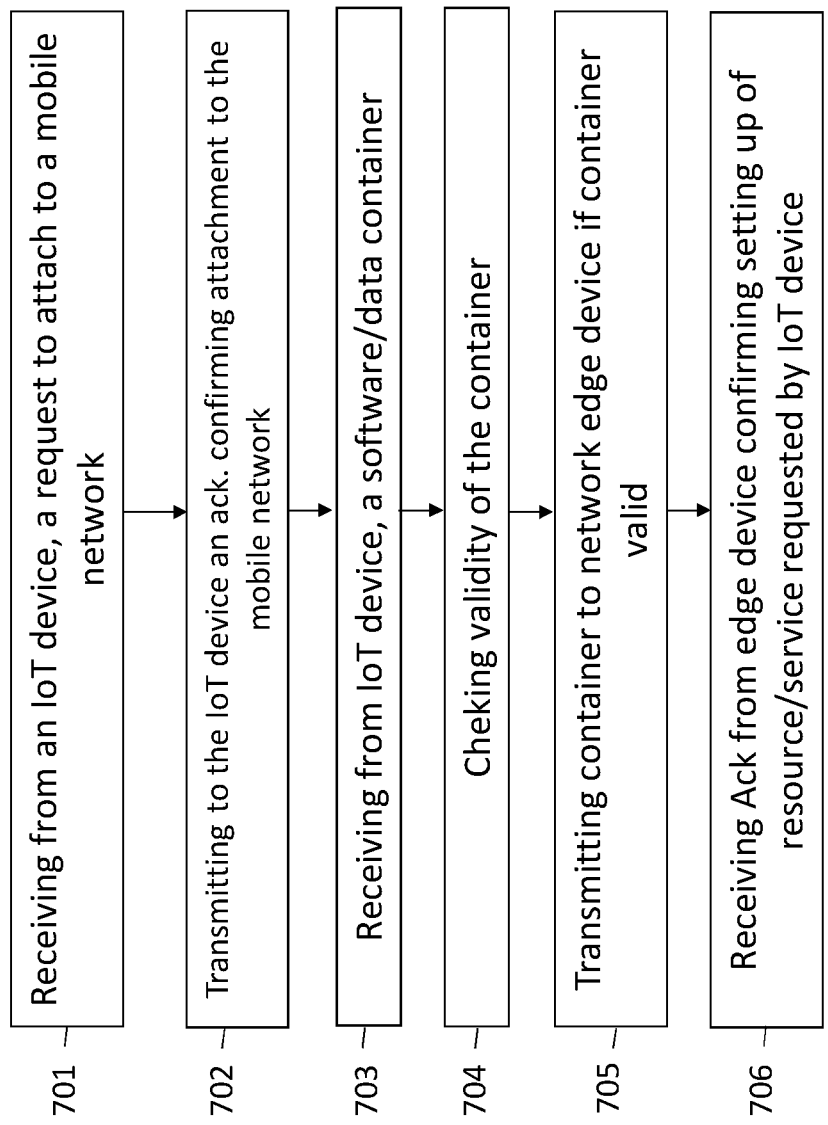
FIG. 7 illustrates a flowchart of a method performed by a core network according to some embodiments herein.

FIG. 7 illustrates a flowchart of a method performed by a core network for the setting up of a resource/service requested by an IoT device, according to some embodiments of the present disclosure.

The method comprises:

(701) receiving from the IoT device a request for attaching the IoT device to a mobile network;

(702) transmitting to the IoT device an acknowledgement confirming attachment to the mobile network;

(703) receiving from the IoT device, a software/data container including features and/or functions needed for running the requested resource/service;

(704) checking the validity of the software/data container;

(705) transmitting to a network edge device the software/data container to be run as art of a VNF environment, when the container is considered valid; and (706) receiving an acknowledgement from the network edge device, confirming the setting up of the resource/service enabling the IoT device to run the resource/service.

The method further comprises receiving, from the IoT device, information of the switching off of the IoT device and sending a request to the network edge device to remove or delete the software/data container.

A core network configured to perform the method described above is also provided. Any suitable core network (hardware) device may be used to perform the method described above.

There is further provided a computer program comprising instructions which when executed on at least one processor residing in the core network (or a core network device) causes the processor to carry out the method previously described. Also, a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of." Although specific terms may be employed herein, they are used in a generic and descriptive sense only and not for purposes of limitation. In particular, the embodiments herein may be applicable is any wireless system, including 3G, 4G, 5G, WiMax, WiFi etc. employing MEC, NFV and VNF features and supporting the use of software containers.

The invention claimed is:

1. A method performed by an Internet-of-Things, IoT, device for requesting a resource/service in a network, the method comprising:

sending a request to a core network requesting attachment to a mobile network;

receiving an acknowledgement from the core network confirming attachment to the mobile network;

sending a request to a network edge device that a resource/service be set up;

transmitting a software/data container including at least one of features and functions needed for running the requested resource/service to the core network which validates and sends the software/data container further to the network edge device to be run as part of a Virtual Network Function, VNF, environment; and running the requested resource/service set up by the network edge device when the core network validates the software/data container.

2. The method according to claim 1, wherein sending the request for attachment is performed when at least one of the IoT device is switched on and when the IoT device roams from a home network to a visited network.

3. The method according to claim 1, further comprising:
informing the core network of switching off of the IoT device; and
receiving from the network edge device an acknowledgment confirming termination of the resource/service.

4. A method performed by a network edge device for setting up a resource/service for an Internet-of-Things, IoT, device, the method comprising:
receiving a request from the IoT device that a resource/service be set up;
receiving, from a core network, a software/data container including at least one of features and functions needed for running the resource/service requested by the IoT device;
running the received at least one of features and functions included in the software/data container, as part of a Virtual Network Function, VNF, environment; and
setting up the requested resource/service for the IoT device enabling the IoT device to run the requested resource/service.

5. The method according to claim 4, further comprising running the at least one of features and functions included in the software/data container when the core network validates the software/data container.

6. The method according to claim 4, further comprising:
receiving from the core network a request to at least one of remove and delete the software/data container when at least one of the IoT device switches off and when the IoT device detaches from the network; and
sending an acknowledgment to the IoT device confirming termination of the resource/service.

7. A method performed by a core network for the setting up of a resource/service for an Internet-of-Things, IoT, device, the method comprising:
receiving, from the IoT device, a request for attaching the IoT device to a mobile network;
transmitting, to the IoT device, an acknowledgement confirming said attachment to the mobile network;
receiving, from the IoT device, a software/data container including at least one of features and functions needed for running a resource/service requested by the IoT device;
checking the validity of the software/data container;
transmitting, to a network edge device, the software/data container to be run as part of a Virtual Network Function, VNF, environment, when the software/data container is considered valid; and
receiving an acknowledgement from the network edge device confirming the setting up of the resource/service for the IoT device.

8. The method according to claim 7, further comprising:
receiving, from the IoT device, information of the switching off of the IoT device; and
sending a request, to the network edge device to at least one of remove and delete the software/data container.

9. An Internet-of-Things, IoT, device for requesting a resource/service in a network, the IoT device being configured to:

send a request, to a core network requesting attachment to a mobile network;
receive an acknowledgement from the core network confirming said attachment to the mobile network;
send a request to a network edge device that a resource/service be set up,
transmit a software/data container including at least one of features and functions needed for running a requested resource/service to the core network which validates and sends the software/data container further to the network edge device to be run as part of a Virtual Network Function, VNF, environment; and
run the requested resource/service set up by a network edge device when the core network validates the software/data container.

10. The IoT device according to claim 9, further configured to send the request when at least one of the IoT device is switched on and when the IoT device roams from a home network to a visited network.

11. The IoT device according to claim 9 is further configured to inform the core network of the switching off of the IoT device and to receive from the network edge device an acknowledgment confirming termination of the resource/service.

12. A network edge device for setting up a resource/service for an Internet-of-Things, IoT, device, the network edge device being configured to:
receive a request from the IoT device that a resource/service be set up;
receive, from a core network, a software/data container including at least one of features and functions needed for running the resource/service requested by the IoT device;
run the received at least one of features and functions included in the software/data container, as part of a Virtual Network Function, VNF, environment; and
set up the requested resource/service for the IoT device enabling the IoT device to run the requested resource/service.

13. The network edge device according to claim 12, further configured to run the at least one of features and functions included in the software/data container when the core network validates the software/data container.

14. The network edge device according to claim 12, further configured to:
receive from the core network a request to at least one of remove and delete the software/data container when the IoT device at least one of switches off and when the IoT device detaches from the network; and
send an acknowledgment to the IoT device confirming termination of the resource/service.

15. The network edge device according to claim 12, wherein the network edge device is part of a Mobile Edge Computing, MEC, network architecture.

16. A core network for the setting up of a resource/service for an Internet-of-Things, IoT, device, the core network being configured to:
receive, from the IoT device, a request for attaching the IoT device to a mobile network;
transmit, to the IoT device, an acknowledgement confirming said attachment to the mobile network;
receive, from the IoT device, a software/data container including at least one of features and functions needed for running a resource/service requested by the IoT device;
check the validity of the software/data container;

transmit, to a network edge device, the software/data container to be run as art of a Virtual Network Function, VNF, environment, when the software/data container is considered valid; and receive an acknowledgement from the network edge device confirming the setting up of the resource/service for the IoT device.

17. The core network according to claim 16, further configured to:

receive, from the IoT device, information of the switching off of the IoT device; and send a request to the network edge device to at least one of remove and delete the software/data container.

* * * * *